(12) United States Patent
Weber et al.

(10) Patent No.: US 7,079,372 B2
(45) Date of Patent: Jul. 18, 2006

(54) FILM AS A DIELECTRIC IN CAPACITORS AND PROCESS FOR ITS PRODUCTION

(75) Inventors: Hans-Leo Weber, Rommerskirchen (DE); Klaus Meyer, Dormagen (DE); Peter Bier, Krefeld (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 10/342,580

(22) Filed: Jan. 15, 2003

(65) Prior Publication Data

US 2003/0156377 A1 Aug. 21, 2003

(30) Foreign Application Priority Data

Jan. 18, 2002 (DE) .............................. 102 01 761

(51) Int. Cl.
*H01G 4/32* (2006.01)

(52) U.S. Cl. .................. 361/311; 361/303; 361/305; 361/313; 361/273; 361/277

(58) Field of Classification Search .............. 361/311, 361/312, 313, 306.1, 323, 523, 273, 274.1, 361/301.5, 301.2, 303, 305, 315
See application file for complete search history.

(56) References Cited

U.S. PATENT DOCUMENTS

| 3,214,657 | A | * | 10/1965 | Davis | 361/273 |
| 4,305,111 | A | * | 12/1981 | Forster | 361/273 |
| 4,527,219 | A | * | 7/1985 | Johnson et al. | 361/323 |
| 4,672,506 | A | * | 6/1987 | Deguchi et al. | 361/323 |
| 4,982,014 | A | | 1/1991 | Freitag et al. | 568/721 |
| 5,077,374 | A | * | 12/1991 | Cleary | 528/86 |
| 5,126,428 | A | | 6/1992 | Freitag et al. | 528/196 |
| 5,227,458 | A | | 7/1993 | Freitag et al. | 528/196 |
| 5,262,511 | A | * | 11/1993 | Caringi et al. | 528/176 |
| 5,633,060 | A | * | 5/1997 | Tokuda et al. | 428/64.1 |
| 6,214,422 | B1 | | 4/2001 | Yializis | 427/488 |
| 6,218,502 | B1 | * | 4/2001 | Westernacher et al. | 528/196 |
| 6,288,202 | B1 | * | 9/2001 | DeSimone et al. | 528/196 |

FOREIGN PATENT DOCUMENTS

| DE | 1 764 859 | | 5/1972 |
| DE | 34 36 122 | | 10/1985 |
| GB | 952905 | | 3/1964 |
| JP | 10332938 A | * | 12/1998 |
| WO | 01/38076 | | 5/2001 |

* cited by examiner

Primary Examiner—Nguyen T. Ha
(74) Attorney, Agent, or Firm—Joseph C. Gil; Aron Preis

(57) ABSTRACT

A dielectric capacitor having self healing properties is disclosed. The capacitor includes a film made of an amorphous aromatic copolycarbonate having a weight average molecular weight of at least 10,000 and a glass transition temperature of at least 160° C. In a preferred embodiment the copolycarbonate includes structural units derived from bisphenol TMC. Also disclosed is a process for making the film.

5 Claims, No Drawings

FILM AS A DIELECTRIC IN CAPACITORS AND PROCESS FOR ITS PRODUCTION

The invention concerns a film as a dielectric in capacitors having self-healing properties and a process for producing such a film.

BACKGROUND OF THE INVENTION

The use of film, especially plastic film, as a dielectric in electric capacitors is known. Such capacitors are distinguished by two types of construction.

Film/foil technology can be regarded as the first construction type. Capacitors of this type contain plastic films as the dielectric and metal foils as electrodes.

Metallised plastic film capacitors are spoken of as the second construction type. They contain a plastic film serving as the dielectric, onto which are vapour-deposited metallically conductive layers as electrodes. Aluminium in a coating thickness of less than $10^{-7}$ m (0.1 μm) is preferably used as the metal.

The most important distinguishing feature of these two types of capacitor construction is the behaviour of the capacitor with regard to electric breakdown. This refers to the phenomenon whereby the—in principle insulating—dielectric can be punctured by the electric charges, leading to a short-circuit. Inevitable weak points in the dielectric can be cited as the reason for the occurrence of a puncture. In the first construction type this short-circuit leads to the failure of the capacitor.

The second construction type is described as "self-healing". In the event of an electric breakdown through the dielectric the vapour-deposited metal coatings in the vicinity of the puncture site vaporise as a result of the high arc temperature. The cause of the short-circuit is effectively burned away. If an electric breakdown occurs, the dielectric forms a highly compressed plasma, which pushes the layers of the dielectric apart. Insulating halos are formed around the puncture. The capacitor remains operational.

Self-healing capacitors are produced from polyethylene terephthalate (PET), poly-propylene (PP), polycarbonate (PC) and polyphenylene sulfide (PPS) films. All of the cited films are partially crystalline plastics.

The disadvantage of partially crystalline plastic is the elevated cost of manufacture. The partially crystalline plastics that can be used to produce films for use as a dielectric in capacitors (with self-healing properties) must display a degree of crystallinity of $\geq 10\%$ in order for self-healing to be observed.

The production of films from amorphous plastic is more favourable. However, self-healing properties have not hitherto been observed in capacitors having a film made from amorphous plastic as the dielectric.

Capacitors are also distinguished by the way in which they are mounted on a printed circuit board. A distinction is made here between capacitors for push-through mounting and capacitors for SMD (surface-mounted device) applications. Capacitors for push-through mounting are fitted with leads. The capacitors are placed on the top of the printed circuit board. The leads extend through the printed circuit board to the printed conductor side, where they are soldered to the printed conductors.

By contrast, SMD components are attached and soldered directly to the printed conductor side of the board. They are therefore exposed to the soldering heat for a few seconds, which places particular demands on the heat resistance of the dielectric film.

The production of polycarbonate films by casting a polycarbonate solution prepared with a suitable solvent onto a flat substrate, with subsequent evaporation of the solvent and lifting of the resultant film from the substrate, is known according to EP-B1 0 359 953. The film produced in this way can then be stretched monoaxially or biaxially. The use of polycarbonates as electrical insulating materials for electric conductors is likewise known from this patent specification.

In another known prior art Makrofol KG® is used as a plastic film for use as a dielectric in capacitors. This is a partially crystalline, longitudinally stretched cast film made from high-molecular polycarbonate, consisting of bisphenol A homopolycarbonate, with a thickness of $2 \cdot 10^{-6}$ m to $6 \cdot 10^{-5}$ m (2 to 60 μm). Metallised film capacitors with a dielectric made from Makrofol KG® display self-healing properties if a coating thickness of no more than $1.2 \cdot 10^{-5}$ m (12 μm) is maintained.

Dielectrics made from plastics such as Makrofol KG® are worthy of improvement. The production of film from Makrofol KG® is complicated, since after being dissolved it has to undergo a complex filtration process. Furthermore, the temperature limits for long-term stress and heat resistance also cause problems. In continuous use capacitors with a metallised plastic film made from Makrofol KG® are operated in temperature ranges of up to 120° C. This limits their use in hot engine compartments, for example. The heat resistance limit of 140° C. causes problems with the hot soldering of SMD capacitors.

The object of the invention is therefore to provide a film as a dielectric for use in capacitors with self-healing properties, with which it is possible for the capacitors to be used in an elevated temperature range and to be fabricated by the SMD process. The film should be reasonably economical to produce.

BRIEF SUMMARY OF THE INVENTION

A dielectric capacitor having self healing properties is disclosed. The capacitor includes a film made of an amorphous aromatic copolycarbonate having a weight average molecular weight of at least 10,000 and a glass transition temperature of at least 160° C. In a preferred embodiment the copolycarbonate includes structural units derived from bisphenol TMC. Also disclosed is a process for making the film.

DETAILED DESCRIPTION OF THE INVENTION

This object with regard to the film is achieved according to the invention in that the film consists of an amorphous polycarbonate. According to the invention it was found that surprisingly it is possible to use a film made from amorphous polycarbonate in place of partially crystalline plastic as a dielectric in capacitors, which nevertheless display self-healing properties. Polycarbonates also possess a higher heat resistance.

An advantageous embodiment of the invention provides that a high-molecular, thermoplastic, aromatic polycarbonate having an average molecular weight $M_w$ of at least 10,000 is used. Furthermore it has proven advantageous to use a polycarbonate having a glass transition temperature of at least 160° C. A further teaching of the invention provides the use of dihydroxydiphenyl cycloalkanes having formula (Ia) as starting products for the polycarbonates

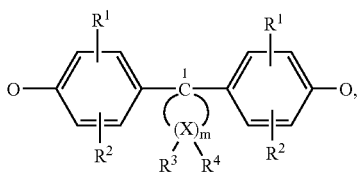

wherein

R¹ and R² independently of one another represent hydrogen, halogen, preferably chlorine or bromine, $C_1$–$C_8$-alkyl, $C_5$–$C_6$-cycloalkyl, $C_5$–$C_{10}$-aryl, preferably phenyl, and $C_7$–$C_{12}$-aralkyl, preferably phenyl-$C_1$–$C_4$-alkyl, more particularly benzyl, m is an integer of from 4 to 7, preferably 4 or 5, R³ and R⁴, individually selectable for each R⁵, independently of one another represent hydrogen or $C_1$–$C_6$-alkyl and X represents carbon, with the proviso that, at least one atom X, both R³ and R⁴ are alkyl.

On one to two X atoms, particularly on only one X atom, R³ and R⁴ are preferably both alkyl.

The preferred alkyl radical is methyl; the X atoms in the α-position to the diphenyl-substituted C atom (C-1) are preferably not dialkyl-substituted, whereas alkyl disubstitution in the β-position to C-1 is preferred.

Dihydroxydiphenyl cycloalkanes having 5 and 6 ring-carbon atoms in the cyclo-aliphatic radical (m=4 or 5 in formula (Ia)) are preferred, for example the diphenols having formulae (Ib) to (Id),

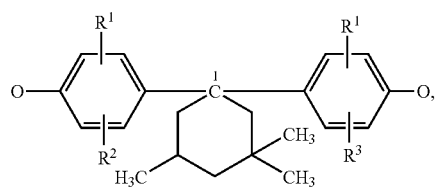

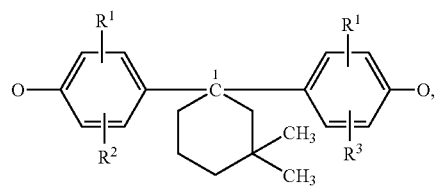

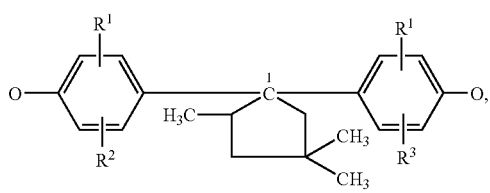

of which 1,1-bis-(4-hydroxyphenyl)-3,3,5-trimethylcyclohexane (formula (Ib) with R¹ and R² both H) is particularly preferred. The polycarbonates can be produced according to EP 359 953 A1 from diphenols having formula (Ia).

Both one diphenol having formula (Ia), forming homopolycarbonates, and more than one diphenol having formula (Ia), forming copolycarbonates, can be used.

The diphenols having formula (Ia) can moreover also be used in combination with other diphenols, for example with those having formula (Ie)

to produce high-molecular, thermoplastic, aromatic polycarbonates.

Suitable other diphenols having formula (Ie) are those in which Z is an aromatic radical with 6 to 30 C atoms, which can contain one or more aromatic nuclei, can be substituted and can contain aliphatic radicals or cycloaliphatic radicals other than those having formula (Ia) or heteroatoms as binding links.

Examples of diphenols having formula (Ie) are: hydroquinone, resorcinol, dihydroxydiphenyls, bi(hydroxyphenyl)alkanes, bis(hydroxyphenyl)cycloalkanes, bis(hydroxyphenyl)sulfides, bis(hydroxyphenyl) ethers, bis(hydroxyphenyl)ketones, bis(hydroxyphenyl)sulfones, bis(hydroxyphenyl)sulfoxides, α,α'-bis(hydroxyphenyl)diisopropyl benzenes and ring-alkylated and ring-halogenated compounds thereof.

These and other suitable diphenols are described e.g. in U.S. Pat. Nos. 3,028,365, 2,999,835, 3,148,172, 3,275,601, 2,991,273, 3,271,367, 3,062,781, 2,970,131 and 2,999,846, in DE-A 1 570 703, 2 063 050, 2 063 052, 2 211 956, Fr-A 1 561 518 and in the monograph "H. Schnell, Chemistry and Physics of Polycarbonates, Interscience Publishers, New York 1964".

Preferred other diphenols are for example: 4,4'-dihydroxydiphenyl, 2,2-bis-(4-hydroxyphenyl)propane, 2,4-bis-(4-hydroxyphenyl)-2-methyl butane, 1,1-bis-(4-hydroxyphenyl)cyclohexane, α,α-bis-(4-hydroxyphenyl)-p-diisopropyl benzene, 2,2-bis-(3-methyl-4-hydroxyphenyl)propane, 2,2-bis-(3-chloro-4-hydroxyphenyl)propane, bis-(3,5-dimethyl-4-hydroxyphenyl)methane, 2,2-bis-(3,5-dimethyl-4-hydroxyphenyl)propane, bis-(3,5-dimethyl-4-hydroxyphenyl)sulfone, 2,4-bis-(3,5-dimethyl-4-hydroxyphenyl)-2-methyl butane, 1,1-bis-(3,5-dimethyl-4-hydroxyphenyl)cyclohexane, α,α-bis-(3,5-dimethyl-4-hydroxyphenyl)-p-diisopropyl benzene, 2,2-bis-(3,5-dichloro-4-hydroxyphenyl)propane and 2,2-bis-(3,5-dibromo-4-hydroxyphenyl)propane.

Particularly preferred diphenols having formula (Ie) are for example: 2,2-bis-(4-hydroxyphenyl) propane, 2,2-bis-(3,5-dimethyl-4-hydroxyphenyl) propane, 2,2-bis-(3,5-dichloro-4-hydroxyphenyl) propane, 2,2-bis-(3,5-dibromo-4-hydroxyphenyl) propane and 1,1-bis-(4-hydroxyphenyl) cyclohexane.

2,2-bis-(4-hydroxyphenyl) propane is particularly preferred. The other diphenols can be used both individually and in combination.

The molar ratio of diphenols having formula (Ia) to the other diphenols having formula (Ie) that can optionally be incorporated should be between 100 mol % (Ia) to 0 mol % (Ie) and 2 mol % (Ia) to 98 mol % (Ie), preferably between 100 mol % (Ia) to 0 mol % (Ie) and 10 mol % (Ia) to 90 mol % (Ie) and particularly between 100 mol % (Ia) to 0 mol % (Ie) and 30 mol % (Ia) to 70 mol % (Ie) and most particularly between 100 mol % (Ia) to 0 mol % (Ie) and 50 mol % (Ia) to 50 mol % (Ie).

The high-molecular polycarbonates produced from diphenols having formula (Ia), optionally in combination with other diphenols, can be produced by the known polycarbonate production processes. The various diphenols can be linked together both randomly and in blocks.

The polycarbonates according to the invention can be branched by known means. If branching is desired, it can be achieved by known means by the incorporation by condensation of small amounts, preferably amounts between 0.05 and 2.0 mol % (relative to diphenols used), of trifunctional or more than trifunctional compounds, in particular those having three or more than three phenolic hydroxyl groups. Examples of branching agents having three or more than three phenolic hydroxyl groups include:

phloroglucinol, 4,6-dimethyl-2,4,6-tri-(4-hydroxyphenyl) heptene-2, 4,6-dimethyl-2,4,6-tri-(4-hydroxyphenyl)heptane, 1,3,5-tri-(4-hydroxyphenyl)benzene, 1,1,1-tri-(4-hydroxyphenyl)ethane, tri-(4-hydroxyphenyl)phenyl methane, 2,2-bis-[4,4-bis-4-hydroxyphenyl)cyclohexyl]propane, 2,4-bis-(4-hydroxyphenyl isopropyl)phenol, 2,6-iso-(2-hydroxy-5-methylbenzyl)-4-methyl phenol, 2-(4-hydroxyphenyl)-2-(2,4-dihydroxyphenyl)propane, hexa-[4-(4-hydroxyphenyl isopropyl)phenyl]orthoterephthalic acid ester, tetra-(4-hydroxyphenyl)methane, tetra-[4-(4-hydroxyphenyl isopropyl)phenoxy]methane and 1,4-bis-[4',4''-dihydroxytriphenyl)methyl]benzene.

Some of the other trifunctional compounds are 2,4-dihydroxybenzoic acid, trimesic acid, cyanuric chloride and 3,3-bis-(3-methyl-4-hydroxyphenyl)-2-oxo-2,3-dihydro-indole.

Monofunctional compounds in conventional concentrates serve as chain terminators for the known regulation of the molecular weight of the polycarbonates. Suitable compounds are for example phenol, tert.-butyl phenols or other alkyl-substituted phenols. Small amounts of phenols having formula (If) are particularly suitable for molecular weight regulation

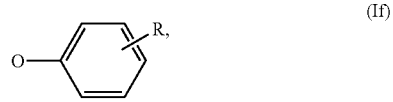

(If)

wherein

R represents a branched $C_8$ and/or $C_9$ alkyl radical.

The content of $CH_3$ protons in the alkyl radical R is preferably between 47 and 89%, that of CH and $CH_2$ protons between 53 and 11%; R is likewise preferably in the ortho and/or para position to the OH group, and the upper limit of the ortho component is particularly preferably 20%. The chain terminators are generally used in quantities of 0.5 to 10, preferably 1.5 to 8 mol %, relative to diphenols used.

The polycarbonates can preferably be produced by known means using the interfacial polycondensation process (cf. H. Schnell "Chemistry and Physics of Polycarbonates", Polymer Reviews, Vol. IX, page 33 ff., Interscience Publ. 1964).

In this process the diphenols having formula (Ia) are dissolved in the aqueous-alkaline phase. To produce copolycarbonates with other diphenols, mixtures of diphenols having formula (Ia) and the other diphenols, for example those having formula (Ie), are used. Chain terminators having for example formula (If) can be added to regulate the molecular weight. They are then reacted with phosgene in the presence of an inert, preferably polycarbonate-dissolving, organic phase by the interfacial polycondensation method. The reaction temperature is between 0° C. and 40° C.

The branching agents that are optionally incorporated (preferably 0.05 to 2.0 mol %) can either be placed with the diphenols in the aqueous-alkaline phase or added before phosgenation, dissolved in the organic solvent. In addition to the diphenols having formula (Ia) and optionally other diphenols (Ie), mono- and/or bis-chloroformic acid esters thereof can also be incorporated, whereby these are added dissolved in organic solvents. The quantity of chain terminators and of branching agents then depends on the molar quantity of diphenolate radicals according to formula (Ia) and optionally formula (Ie); if chloroformic acid esters are incorporated, the amount of phosgene can be correspondingly reduced by known means.

Suitable organic solvents for the chain terminators and optionally for the branching agents and the chloroformic acid esters are for example methylene chloride, chlorobenzene, in particular mixtures of methylene chloride and chlorobenzene. The chain terminators and branching agents used can optionally be dissolved in the same solvent.

Methylene chloride, chlorobenzene and mixtures of methylene chloride and chlorobenzene for example serve as the organic phase for the interfacial polycondensation process.

NaOH solution, for example, serves as the aqueous alkaline phase. Production of the polycarbonates A by the interfacial polycondensation process can be catalysed by conventional means using catalysts such as tertiary amines, particularly tertiary aliphatic amines such as tributylamine or triethylamine; the catalysts can be used in quantities from 0.05 to 10 mol %, relative to moles of diphenols used. The catalysts can be added before the start of phosgenation or during or even after phosgenation.

The polycarbonates can be produced by the known process in the homogeneous phase, the so-called "pyridine process" and by the known melt interesterification process, using for example diphenyl carbonate in place of phosgene.

The polycarbonates preferably have a molecular weight $M_w$ (weight-average, determined by gel chromatography after prior calibration) of at least 10,000, particularly preferably from 20,000 to 300,000 and in particular from 20,000 to 80,000. They can be linear or branched and are homopolycarbonates or copolycarbonates based on diphenols having formula (Ia).

By the incorporation of diphenols having formula (Ia), new polycarbonates with high heat resistance are produced which also otherwise display good general properties. This is particularly true of the polycarbonates based on diphenols having formula (Ia) in which m is 4 or 5, and most particularly of the polycarbonates based on diphenols (Ib), wherein $R^1$ and $R^2$ mutually independently have the meaning cited for formula (Ia) and are particularly preferably hydrogen.

The particularly preferred polycarbonates are therefore those in whose structural units having formula (I) m=4 or 5, most particularly those consisting of units having formula (Ig)

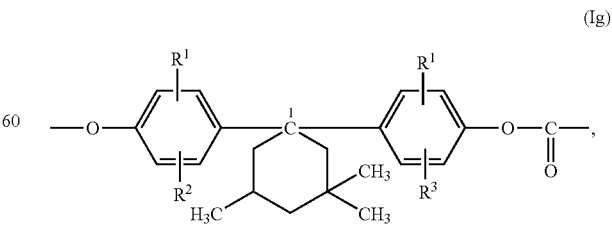

(Ig)

wherein $R^1$ and $R^2$ have the meaning cited for formula (I), but are particularly preferably hydrogen.

These polycarbonates based on diphenols having formula (Ib), wherein $R^1$ and $R^2$ are in particular hydrogen, also display in addition to high heat resistance a good UV stability and good flow properties in the melt, which was not to be expected.

The polycarbonate properties can moreover be varied favourably by combining them in any way with other diphenols, in particular with those having formula (Ie). In such copolycarbonates the diphenols having formula (Ia) are contained in polycarbonates in quantities of 100 mol % to 2 mol %, preferably in quantities of 100 mol % to 10 mol % and particularly in quantities of 100 mol % to 30 mol % and most particularly of 100 mol % to 50 mol %, relative to the total quantity of 100 mol % of diphenol units.

It has been found that such polycarbonates display an especially high heat resistance whilst retaining their self-healing properties.

According to a further teaching of the invention, the thickness of the dielectric should preferably be $10^{-7}$ to $10^{-4}$ m (0.1 to 100 μm). An embodiment of the invention provides for a range from $5 \cdot 10^{-7}$ m to $2 \cdot 10^{-5}$ m (0.5 to 20 μm) and a further embodiment of the invention a range from $1.2 \cdot 10^{-6}$ m to $8 \cdot 10^{-6}$ m (1.2 to 8 μm).

With regard to the process for producing a film as described above, the object is achieved according to the invention by a first alternative in that the plastic dissolved by a solvent is cast on a casting drum. The film produced in this way can be stretched after being cast if necessary. A second alternative of the solution according to the invention with regard to the process for producing a film as described above provides that the plastic dissolved by a solvent is applied to a substrate in the rotogravure printing process.

For both process alternatives an amorphous copolycarbonate can be used as plastic. A preferred embodiment of both process alternatives provides that a high-molecular, thermoplastic, aromatic polycarbonate with an average molecular weight $M_w$ of at least 10,000 to preferably 60,000, particularly preferably 25,000 to 40,000, is used. The subsequent production processes can be performed more economically because of the lower viscosity. Moreover in both cases methylene chloride or butanone can be used as solvent.

According to a further embodiment of the second process alternative of the invention, either PET film or paper can be used as substrate. The film can moreover be released from the substrate before undergoing further processing.

The invention is explained in more detail below by reference to an example representing only one preferred embodiment example. An approximately 10% solution is produced from the copolycarbonate (Apec® KU 1-9203 from Bayer AG) consisting of 45 mol % BPA and 55 mol % dihydroxydiphenyl cycloalkane having formula (Ib) (with $R^1$ and $R^2$ both H) (bisphenol TMC) by dissolution in methylene chloride. Butanone can alternatively be used for dissolution. A film of thickness $7 \cdot 10^{-6}$ m (7 μm) is then produced by casting on a casting drum. This film is stretched on a stretching unit by longitudinal stretching to produce a film of thickness $5 \cdot 10^{-6}$ m (5 μm).

The capacitors are produced by making the film and plating the film with electrically conductive coatings.

The capacitors produced in this way then undergo a dielectric test to demonstrate their self-healing properties. The voltage for this test is chosen such that electric breakdowns occur at electrical weak points. The electrical resistance of the capacitor is then measured and the product of the capacity of the capacitor in μF and the electrical resistance in MΩ is calculated. Capacitors qualify as being self-healing if the value calculated in this way is greater than 5000 s.

Surprisingly and unforeseeably for the person skilled in the art, the capacitors produced with a film as dielectric made from the amorphous copolycarbonate APEC® satisfy the above condition, although capacitors with a film made from amorphous bisphenol A homopolycarbonate do not satisfy the above condition.

The advantages of using APEC® to produce the plastic film are that the film can be produced more easily, APEC® unlike Makrofol KG® is more readily soluble and the solution displays an unlimited pot life, which means that the solution can be stored for extended periods. The solution pot life of Makrofol KG® is limited to a few days. APEC® moreover has superior casting properties, since more homogeneous regions are produced. APEC® displays a higher heat resistance than bisphenol A homopolycarbonate.

The invention claimed is:

1. A self-healing dielectric capacitor comprising a film of amorphous copolycarbonate, said copolycarbonate having a weight average molecular weight of at least 10,000, glass transition temperature of at least 160° C, and thickness of $10^{-7}$ to $10^{-4}$ m.

2. The capacitor of claim 1 wherein the copolycarbonate includes structural units derived from bisphenol TMC.

3. The capacitor of claim 1 wherein the film has a thickness of $5 \cdot 10^{-7}$ m to $2 \cdot 10^{-5}$ m.

4. The capacitor of claim 1 wherein the film has a thickness of $1.2 \cdot 10^{-6}$ m to $8 \cdot 10^{-6}$ m.

5. The capacitor of claim 1 wherein the copolycarbonate is branched.

* * * * *